(12) United States Patent
Chandrachood et al.

(10) Patent No.: US 9,106,563 B2
(45) Date of Patent: Aug. 11, 2015

(54) METHOD AND APPARATUS FOR SWITCHING COMMUNICATIONS TRAFFIC IN A COMMUNICATIONS NETWORK

(75) Inventors: Santosh Chandrachood, Milpitas, CA (US); Pawan Uberoy, San Jose, CA (US)

(73) Assignee: WiChorus, Inc., Santa Clara, CA (US)

( * ) Notice: Subject to any disclaimer, the term of this patent is extended or adjusted under 35 U.S.C. 154(b) by 1103 days.

(21) Appl. No.: 12/900,354

(22) Filed: Oct. 7, 2010

(65) Prior Publication Data

US 2011/0085439 A1 Apr. 14, 2011

Related U.S. Application Data

(60) Provisional application No. 61/278,496, filed on Oct. 7, 2009.

(51) Int. Cl.

| | | |
|---|---|---|
| H04L 12/26 | (2006.01) | |
| H04L 12/801 | (2013.01) | |
| H04L 12/28 | (2006.01) | |
| H04L 12/725 | (2013.01) | |
| H04L 12/851 | (2013.01) | |
| H04L 12/24 | (2006.01) | |
| H04L 12/707 | (2013.01) | |
| H04L 12/703 | (2013.01) | |

(52) U.S. Cl.
CPC ............ *H04L 47/14* (2013.01); *H04L 12/2876* (2013.01); *H04L 45/308* (2013.01); *H04L 47/2441* (2013.01); *H04L 41/5019* (2013.01); *H04L 43/026* (2013.01); *H04L 45/22* (2013.01); *H04L 45/28* (2013.01)

(58) Field of Classification Search
None
See application file for complete search history.

(56) References Cited

U.S. PATENT DOCUMENTS

| | | |
|---|---|---|
| 6,707,826 B1 | 3/2004 | Gorday et al. |
| 7,065,083 B1 | 6/2006 | Oren et al. |
| 7,065,085 B2 | 6/2006 | Shin |
| 7,076,551 B2 | 7/2006 | Gary |
| 7,277,948 B2 | 10/2007 | Igarashi et al. |
| 7,657,706 B2 | 2/2010 | Iyer et al. |

(Continued)

FOREIGN PATENT DOCUMENTS

WO    WO 2011/044396 A2    4/2011

OTHER PUBLICATIONS

International Preliminary Report on Patentability; International Application No. PCT/US2010/051874 Date of Mailing: Apr. 19, 2012.

*Primary Examiner* — Rhonda Murphy
(74) *Attorney, Agent, or Firm* — Hamilton, Brook, Smith & Reynolds, P.C.

(57) ABSTRACT

In current hardware forwarding architectures, in which subscriber profiles are distributed across multiple cards in the network, lack of subscriber knowledge leads to loss of bandwidth on fabric links connecting multiple cards in a chassis, loss of device processing cycles, and loss of quality of service knowledge because the traffic is not classified. An example embodiment of the present invention employs a subscriber-aware switch programmed with a subscriber table that maps subscriber traffic to an "anchor" line card with the subscriber's profile. The subscriber table allows for traffic to reach the anchor line card directly, avoiding unnecessary hops and loss of traffic information. As a result, line card, fabric, and other resources are used efficiently, thereby enabling a gateway or other network node to support high traffic rate (e.g., 100 Gbps) network models.

21 Claims, 8 Drawing Sheets

(56) References Cited

U.S. PATENT DOCUMENTS

| | | |
|---|---|---|
| 7,706,291 B2 | 4/2010 | Luft et al. |
| 7,719,995 B2 | 5/2010 | Luft |
| 7,733,891 B2 | 6/2010 | Reynolds et al. |
| 7,773,510 B2 | 8/2010 | Back et al. |
| 7,855,982 B2 * | 12/2010 | Ramankutty et al. ......... 370/259 |
| 8,018,955 B2 | 9/2011 | Agarwal et al. |
| 8,036,230 B2 * | 10/2011 | Gray et al. ................... 370/400 |
| 8,111,705 B1 | 2/2012 | Bartlett et al. |
| 8,111,707 B2 | 2/2012 | Riddle et al. |
| 8,284,786 B2 | 10/2012 | Mirandette et al. |
| 8,381,264 B1 | 2/2013 | Corddry et al. |
| 8,531,945 B2 | 9/2013 | Chandrachood et al. |
| 8,533,360 B2 | 9/2013 | Chandrachood et al. |
| 8,745,179 B2 | 6/2014 | Raghavan et al. |
| 2001/0049753 A1 | 12/2001 | Gary |
| 2005/0050136 A1 | 3/2005 | Golla |
| 2006/0026682 A1 | 2/2006 | Zakas |
| 2008/0013470 A1 | 1/2008 | Kopplin |
| 2008/0137646 A1 | 6/2008 | Agarwal et al. |
| 2008/0155101 A1 | 6/2008 | Welsh et al. |
| 2008/0274729 A1 | 11/2008 | Kim et al. |
| 2009/0083367 A1 | 3/2009 | Li et al. |
| 2009/0086651 A1 | 4/2009 | Luft et al. |
| 2009/0116513 A1 | 5/2009 | Gray et al. |
| 2009/0129271 A1 | 5/2009 | Ramankutty et al. |
| 2009/0285225 A1 | 11/2009 | Dahod |
| 2010/0191839 A1 | 7/2010 | Gandhewar et al. |
| 2010/0192207 A1 | 7/2010 | Raleigh |
| 2010/0229192 A1 | 9/2010 | Marilly et al. |
| 2010/0325275 A1 | 12/2010 | Van Elburg et al. |
| 2011/0020236 A1 | 1/2011 | Bohmer et al. |
| 2011/0021236 A1 | 1/2011 | Dinan et al. |
| 2011/0080886 A1 | 4/2011 | Chandrachood |
| 2011/0085571 A1 | 4/2011 | Chandrachood |
| 2011/0087786 A1 | 4/2011 | Chandrachood |
| 2011/0087798 A1 | 4/2011 | Chandrachood |
| 2011/0238855 A1 * | 9/2011 | Korsunsky et al. ........... 709/231 |

* cited by examiner

METHOD AND APPARATUS FOR SWITCHING COMMUNICATIONS TRAFFIC IN A COMMUNICATIONS NETWORK

RELATED APPLICATION

This application claims the benefit of U.S. Provisional Application No. 61/278,496, filed on Oct. 7, 2009, the entire teachings of which are incorporated herein by reference. The teachings of all patents, published applications, and references cited herein are incorporated by reference in their entirety.

BACKGROUND OF THE INVENTION

In subscriber aware networks, such as Worldwide Interoperability for Microwave Access (WiMax) networks, High Speed Packet Access (HSPA) networks, $3^{rd}$ Generation Partnership Project Long Term Evolution (3GPP LTE) networks etc., a large number of subscribers can be hosted by distributing subscriber knowledge across different modules (e.g., cards in a chassis). However, such distribution cannot be achieved unless a subscriber's signaling and data packets are seen by a forwarding entity, such as a network processing unit (NPU) in a line card within a gateway, where the NPU can be specialized hardware that processes networking packets. After inspecting a packet in the NPU, the NPU forwards the packet to an NPU of a line card that hosts the subscriber's profile. The NPU of the host line card then handles forwarding activities pursuant to parameters of the subscriber's profile, such as priority or bandwith allocation.

SUMMARY OF THE INVENTION

According to an example embodiment, there is provided a first apparatus, for example, a network node that includes multiple functional elements, where one functional element is designated as an anchor functional element ("anchor"). The anchor is determined based on a subscriber identifier that is unique to a specific subscriber. A fabric operably interconnects the multiple functional elements, which can be line cards in chassis or virtual modules in network node(s), and the functional elements are further operably interconnected to a switch. The switch is configured to forward the subscriber traffic to the anchor functional element, based on traffic identifiers within communications traffic and associated with the specific subscriber identifier.

According to another example embodiment, there is provided a second apparatus, for example, a communications switch in a communications network configured to determine a unique subscriber identifier of communications traffic. Based on the unique subscriber identifier, the switch determines a specific functional element, an anchor functional element among multiple functional elements. By determining the anchor functional element, the switch can forward the communications traffic to the functional element (i.e., the anchor functional element) that, in turn, conserves resources available to the multiple elements.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

Figure 1:
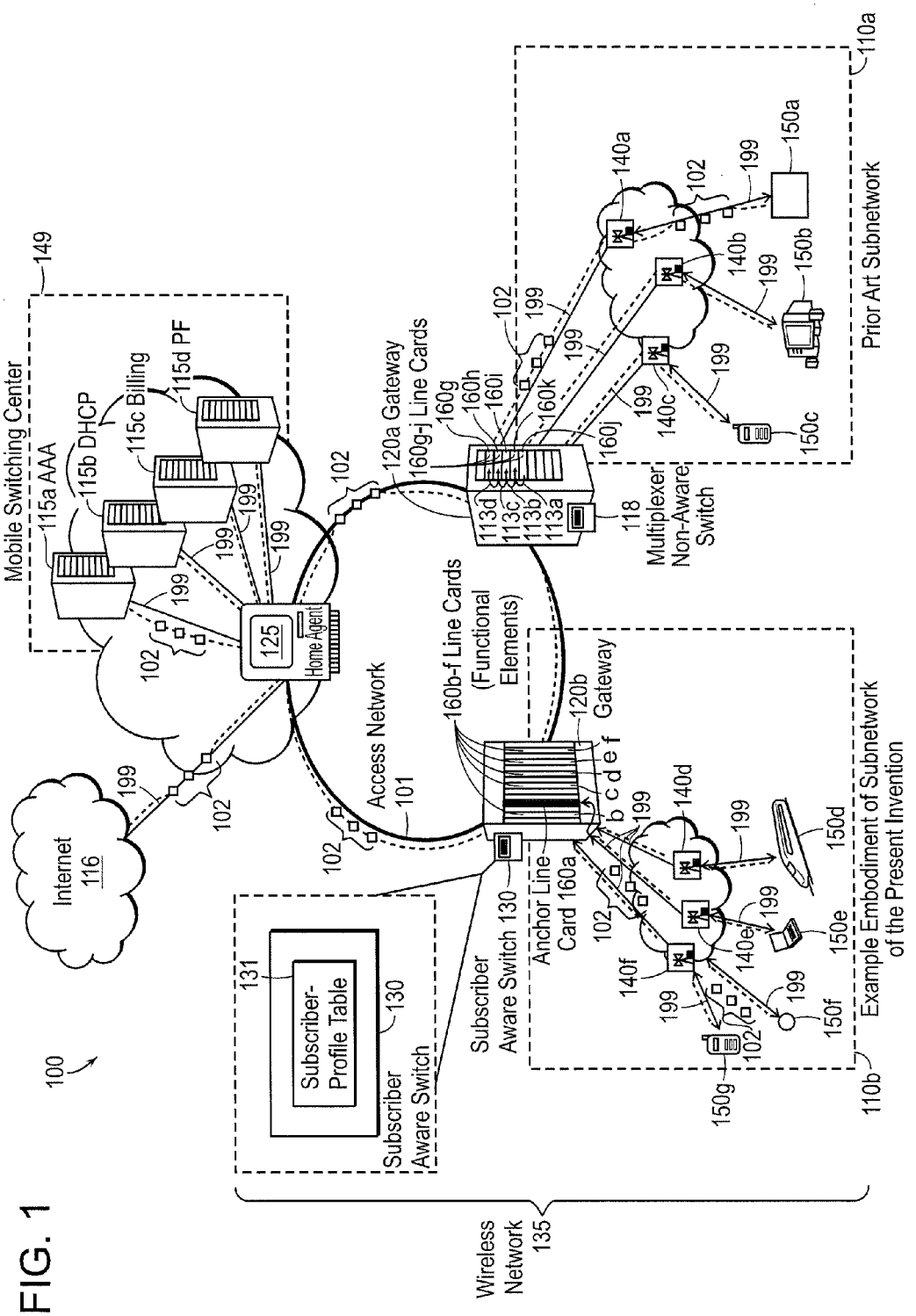
FIG. 1 is a network diagram of a prior art access portal and an embodiment of the invention that illustrates network elements operably interconnected via wireline or wireless mediums.

A description of example embodiments of the invention follows.

Embodiments of the present invention include methods, apparatuses, and computer program products for subscriber distribution and load balancing of subscriber traffic employing a mid-plane design in a subscriber-aware platform.

In typical hardware forwarding architectures, packets are seen and decoded by a network processing unit (NPU), which may be located on a line card of, for example, a network gateway or other network node. In a case in which subscriber profiles correspond to subscribers in a mobile network distributed across multiple functional elements (e.g., a line card or line cards in a chassis), subscriber traffic may arrive on a card that does not host a particular subscriber's profile. Therefore, subscriber traffic may require multiple blind hops between multiple line cards in order to find the line card hosting that subscriber's profile, where each of the hops uses resources of the line cards and interconnecting fabric, such as a backplane data or system bus consuming the resources, such as fabric availability or bandwith, NPU cycles, or knowledge of quality of service (QoS).

Example embodiments of the present invention can allow for a mid-plane design that can include functional elements, such as line cards interconnected operably by a fabric. Once subscriber traffic enters a gateway node, a device, such as a subscriber-aware switch, can be programmed with a subscriber profile table that maps a subscriber to the proper hosting slot information of a line card provisioned with or maintaining that subscriber's profile. Example embodiments of the present invention have an ability to switch traffic to a hosting NPU of a line card, thereby avoiding unnecessary hops in the system. Alternatively, an embodiment may employ QoS classifiers to classify the subscriber traffic to allow for traffic to be scheduled across any line cards in a chassis connected by the fabric to reach the proper hosting line card, referred to interchangeably herein as an anchor line card or just "anchor."

Embodiments of the present invention provide various technical advantages of conventional methods and apparatuses for allocating resources in a network node, such as adding intelligence in a switch in order to steer subscriber-traffic to a line card having subscriber information, thereby saving bandwidth and resources. In alternative example embodiments, various technical advantages exist, such as employing a subscriber-aware architecture to avoid across card fabric hops. Some of these technical advantages are shown and described in the description of the present invention with respect to the accompanying figures. Certain embodiments of the present invention may enjoy some, all, or none of these advantages. Other technical advantages may be readily apparent to those skilled in the art from the following figures, description, and claims.

In some example embodiments, QoS can allow for resource reservation and control or can provide different priorities to different elements of the network, including, for example, providing different services based on applications, subscribers, performance level, data flows, or other commonly known or hereafter developed elements supporting QoS specifications. QoS parameters can include, for example, delay, jitter, bit rate, guarantees, bandwidth, or other commonly employed or hereafter-developed parameters useful for quality of service in a network.

In alternative example embodiments of the present invention, network resources or hardware resources can include, for example, NPU, central processing unit (CPU), or other hardware resources, such as search capabilities, ternary content adjustable memory (TCAM), control functions, statistics, memory channels, fabric buffering memory, fabric backplane, or other commonly known or hereafter developed network resources.

FIG. 1 is a network diagram of a network 100 illustrating aspects of an example embodiment of the invention. The network 100 can be any type of network configured to enable wireless access, such as a wide area network (WAN) having wireless access thereto, wireless broadband network employing a Worldwide Interoperability for Microwave Access (WiMax) network, High Speed Packet Access (HSPA) network, $3^{rd}$ or $4^{th}$ Generation Partnership Project Long Term Evolution (GPP LTE) network, or other commonly employed or hereafter-developed network. The network 100 can include at least one access network 101 to interconnect operably with a number of network elements, may include, for example, mobile end user devices 150a-g, referred to herein as mobile devices or subscriber devices.

The access network 101 can connect basic network elements such as a mobility management entity (MME) (not shown), home location register (HLR) (not shown), home agent 125, gateways 120a-b, or other known network elements. The access network 101 connects to at least one base transceiver station (base stations) 140a-f, either directly or through additional networks, such as an edge network (not shown), which connects mobile devices 150a-g via a telecommunications interface or wireless medium, e.g., an air interface. The home agent 125 further connects the wireless network 135 to external networks, e.g., the Internet 116 or a mobile switching center 149 containing service portals 115a-d. The service portals 115a-d can provide support for multiple service types through use of, for example, an authentication, authorization, and accounting (AAA) server 115a, dynamic host configuration protocol (DHCP) server 115b, billing server 115c, home policy function (PF) server 115d, or other type of portal that may be used at the mobile switching center 149 or other network control location. The AAA server 115a may provide authentication services to validate a subscriber, authorization to determine the subscriber's rights, and accounting to determine subscriber's usage. The DHCP server 115b may provide for address allocation services in a manual, automatic, or dynamic manner, or as otherwise provided by a network administrator. For example, the DHCP server 115b may receive a packet from other network elements requesting the Internet protocol (IP) address of the packet, for which the DHCP server 115b can perform a lookup and provide the information to the requesting element. The home PF server 115d may provide general policy rules or application dependent policy rules. The home PF server 115d may also evaluate network requests against the policies and may be associated with a home policy database, which may be associated with a network service provider. Details of application resources are described further in Applicants' granted U.S. Pat. No. 8,533,360 filed concurrently Oct. 7, 2010, entitled "Method and Apparatus to Report Resource Values in a Mobile Network" by Santosh Chandrachood and Henry Fung, which claims priority to Applicants' U.S. Provisional Patent Application No. 61/278,520, filed Oct. 7, 2009, entitled "A Method and Apparatus to Read Large Hardware Counters in a Scalable Way" by Chandrachood et al., the entire teachings of both applications being incorporated herein by reference in their entirety.

Continuing to refer to the example embodiment of FIG. 1, traffic 102, originating at a mobile device such as a portable computer mobile device 150a, may travel toward its respective base station 140a via a wireless medium 199. The base stations 140a may, in turn, forward the traffic 102 to a corresponding gateway 120a via a wired or wireless medium 199. The gateway 120a can be any of a multitude of wireless gateways, such as an Access Signaling Node Gateway (ASN-GN), Gateway GPRS Support Node (GGSN), Serving General Packet Radio Service Support Node (SGSN), System Architecture Evolution (SAE) gateway, or other currently known or hereafter-developed gateway. In the example network 100, the gateway 120b contains at least one functional element, such as a line card, that supports traffic packets, or other traffic signals, at traffic rates; multiple line cards in a chassis 160b-f can also be present.

An example embodiment of the present invention includes a subscriber-aware switch, such as the switch 130 in FIG. 1, which directs traffic from a subscriber to the specific line card where the subscriber's profile is maintained. The specific line card may be referred to herein as an "anchor" line card. In alternative example embodiments of the present invention, the subscriber-aware switch 130 can be found at a network backbone of a network or a gateway node, such as the gateway 120b of FIG. 1. In one example embodiment, the switch 130 can be configured to determine a subscriber profile associated with the communications traffic 102. The subscriber-aware switch 130 has knowledge of the subscriber's profile location, whereas previous switches are non-subscriber-aware switches, such as a multiplexer (MUX) switch 118 that merely switches traffic without awareness of the traffic's destination as a function of its source.

An example of a prior art subnetwork 110a includes similar elements and components as the network 100 as a whole, including, for example, subscriber devices 150a-c connected to base stations 140a-c via a wired or wireless medium 199. The base stations 140a-c are similarly connected to a gateway node 120a via mediums 199. The gateway 120a may include a multiplexer switch 118, which simply forwards traffic signals from an input to an output based on header information, and may include a line card 160g (or multiple line cards 160g-j) for processing functions.

The MUX switch 118 switches incoming data from an input port to a specific output port. The MUX switch 118 determines a packet address, such as a media access control (MAC) address from a frame in an Ethernet local area network (LAN) or an Internet protocol (IP) address from a packet in a packet-switched network, and corresponding output port to use to forward the traffic towards its final destination. In an open systems interconnection (OSI) reference model, the MUX switch 118 reads a physical address from header information (e.g, a destination MAC address) or performs a look-up of the destination in a routing table of a router.

In large mobile communications networks, such as the network 100, a MUX switch can receive a traffic packet and merely determine its next destination based on the header information of the packet and switch the packet 102 to a next point (known as a "hop") in the network. The greater number of hops a traffic packet must be sent on to reach its destination causes latency in the network. In the example prior art sub-network 110a, the MUX switch 118 receives subscriber traffic from the base stations 140a-c via the connection mediums 199. The MUX switch 118, having no knowledge about subscriber information or subscriber profile s regarding to the traffic is being sent, merely receives the traffic at the switch and, upon reading the header information, forwards the packet to the next hop. In this example, the next hop 113a is to line card 160j. If the line card 160j does not contain a subscriber profile indicating where the subscriber traffic flow should be sent, line card 160j forwards the packet to a second next hop 113b, such as to line card 160i, which itself may not know the subscriber profile and, in turn, again forwards the traffic via a third next hop 113c, such as to line card 160h. A final next hop 113d to line card 160g, which contains a subscriber profile, allows for the traffic to continue to a destination outside the gateway node 120a, which is generally defined as a network node at a level of a network that connects one network with another portion of a network. The MUX switch 118 in combination with the traditional forwarding action of the line cards 160g-j causes any number of hops 113a-d because the MUX switch 118 must figure out blindly where to forward the data. Thus, such an unaware MUX switch causes a significant amount of network latency, which, in turn, reduces bandwidth capacity as traffic reaches a bottleneck in the gateway node 120a.

Example embodiments of a portion of the network 100, sub network 110b, that employs an embodiment of the present invention has improved efficiency over the above-described sub-network 110a subscriber-aware switch, such as the switch 130 in the second gateway 120b. The subscriber-aware switch 130 directs traffic received from a subscriber device to the specific line card where the subscriber's profile is maintained, referred to herein as an anchor line card. For example, the subscriber-aware switch 130 can be configured to determine a subscriber profile or a unique subscriber identifier associated with the communications traffic 102. In the example embodiment, the subscriber-aware switch 130 can dynamically maintain a subscriber profile table 131, which can learn subscriber profile information and a location of the subscriber's profile. Using the subscriber profile table 131, the switch 130 can determine a line card containing the subscriber information and designate that line card as the anchor line card 160a.

In operation, the switch 130, being a subscriber-aware switch, provides efficiency by having knowledge of or the ability to determine the subscriber's profile at the anchor line card 160a, among the multiple line cards 160a-f. In an alternative example embodiment, the traffic forwarded to the anchor line card 160a can then be passed, with the subscriber profile information and traffic packet payload, to other line cards via a fabric (described in FIG. 2) as may be needed to direct the traffic to its destination port.

The anchor functional element 160a (described in more detail below in reference to FIG. 2), which contains the subscriber-profile, receives the traffic 102, from the downstream base station 140d via the subscriber-aware switch 130 and may perform network resource functions prior to transmitting the traffic 102 to a home agent 125 or final destination. In an example embodiment of the present invention, a subscriber 150f may have a profile at the line card 160a, which is thereby designated as the anchor line card from among other line cards 160b-f because the subscriber's 150f profile is located at that line card 160a. However, any of the line cards 160a-f can be designated as the anchor line depending upon where a subscriber profile is located.

In one embodiment, upon receipt of a signaling packet, such as an SS7 signaling packet in a voice over Internet protocol (IP) packet switched network or an R6 signaling packet in an IPv6 packet switched network, the subscriber-aware switch 130 can extract subscriber information from the source (or destination) identifier in the header and, if available, subscriber profile information. Using that information, the switch 130 may itself assign the line card to be the anchor line card for the subscriber and provide the profile information to the anchor line card or assign the line card to be the anchor line card for the subscriber and cause the anchor line card to obtain the subscriber's profile information from an external resource, such as a service provider's subscriber database server. In another embodiment, the same activities can be initiated by the subscriber-aware switch's 130 receipt of a traffic signal having a known or unknown source (or destination) address. In embodiments in which subscriber profiles timeout after periods of inactivity by a given subscriber, the switch 130 updates its table 131 to remove the line card's "anchor" designation for the "timed-out" subscriber, resulting in the foregoing process to begin again upon receipt of a next signaling or traffic from the subscriber. Although inefficiency is experienced, overall efficiency and resources conserved are improved. In some embodiments, the subscriber-aware switch 130, in addition to providing efficiency by directing a subscriber's traffic to its designated anchor line card, can apply the subscriber's profile in a manner consistent with how other network nodes, such as the anchor line card apply it. For example, the switch 130 may give a subscriber's traffic higher (or lower) priority than other subscriber's traffic based on its profile, regulate traffic rate or bandwidth, or perform other activities in accordance with the subscriber's profile. Details of which are described in Applicants' pending U.S. patent application Ser. No. 12/900,243 filed concurrently Oct. 7, 2010, entitled "Method and Apparatus for Assigning Resources in a Network Node" by Santosh Chandrachood, which claims priority to Applicants' U.S. Provisional Patent Application No. 61/278,486, filed Oct. 7, 2009, entitled "A Method and Apparatus to Allocate Network Processing Unit Resources Dynamically in Fast Path Without Host CPU Involvement and Without Statically Holding Up Resources" by Chandrachood, the entire teachings of both applications being incorporated herein by reference in their entirety.

It should be understood that the anchor line card 160a receives the subscriber's traffic from the subscriber-aware switch 130, but the anchor line card 160a may still forward the subscriber's traffic after its processing via a fabric (not shown) to other line card(s) 160b-f if other line card(s) have logical or physical connections to parts or channels the anchor line card does not. In such cases, the receiving line card(s) 160b-f may act as "dumb" line cards or may themselves perform activities consistent with the subscriber's profile. The foregoing egress activities for a source subscriber at a near end of the network may be applied in reverse for ingress traffic from a destination subscriber at a far end of the network.

Figure 2:
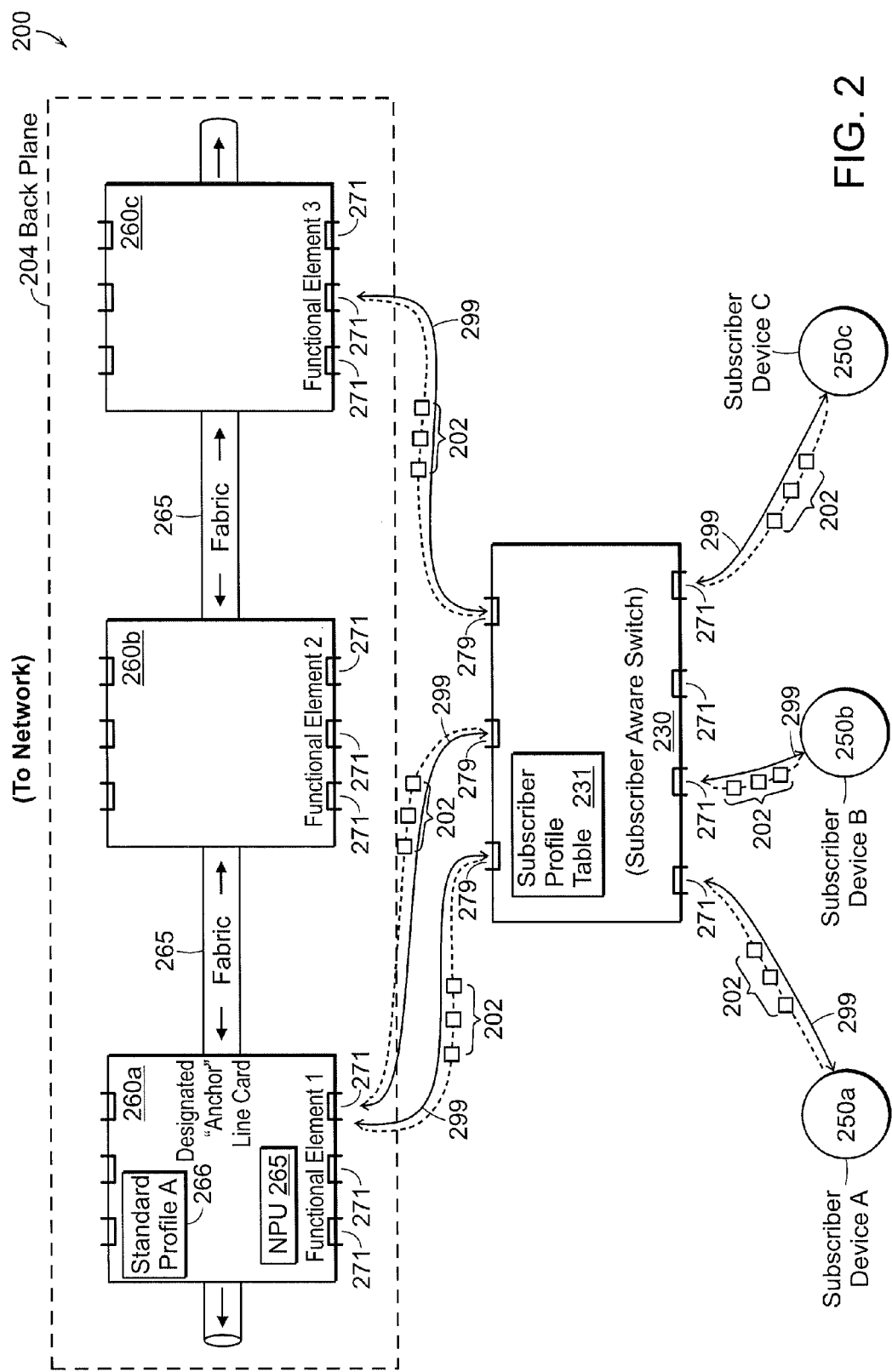
FIG. 2 is a system diagram of an embodiment of the invention that illustrates interconnected network elements.

FIG. 2 is a high-level system diagram 200 of an embodiment of the invention illustrating interconnected network elements. The example embodiment of the system diagram 200 can include subscriber devices 250a-c, subscriber-aware switch 230 maintaining a subscriber-profile table 231, functional elements 260a-c, fabric 265, and a backplane 204.

In the example embodiment, subscriber devices 250a-c can connect to the subscriber-aware switch 230 via wireless or wireline connections 299; alternatively, the subscriber-devices 250a-c can pass through base stations (not shown) or intermediary networks (not shown) prior to reaching the subscriber-aware switch 230.

Alternative example embodiments of the first and second apparatuses (as described above in the Summary of the Invention) allow the subscriber profile table 231 to determine the anchor functional element 260a that maintains a subscriber profile 266 that contains information on each subscriber, such that the subscriber profile 266 is accessible to the subscriber-aware switch 230. Maintenance of the subscriber profile table 231 allows the switch to map specific subscriber identifiers with the proper hosting-slot information of a forwarding entity, such as a network node or sub-element thereof. The subscriber-aware switch 230 may also classify traffic 202; where classifications, for example, can be quality of service (QoS) classifiers that can be used to forward the traffic to ingress-interface ports 271 of one or more of the functional elements 260a-c.

In alternative example embodiments, the subscriber-aware switch 330 may be enabled further to redirect communications traffic in a subscriber-aware, fast-forwarding manner in the occurrence of a failover; thereby allowing subscriber traffic to be transmitted to the appropriate forwarding entity. The functional elements 260a-c may include (as illustrated in the anchor functional element 260a, the elements of which may be applicable to the functional elements 260b-c) forwarding entities (not shown), load-balancing elements (not shown), network processing unit(s) (NPU) 263, central processing unit(s) (CPU) (not shown), memory (not shown), or other components and sub-components as are commonly employed or hereafter developed in line cards. Alternative example embodiments can include a back plane 204 configured to interconnect elements, such as the functional elements 260a-c, multiple line cards in a chassis (e.g., the line cards 160a-f of FIG. 1), the fabric 265, or other commonly employed or hereafter developed elements of backplane architecture.

Figure 3:
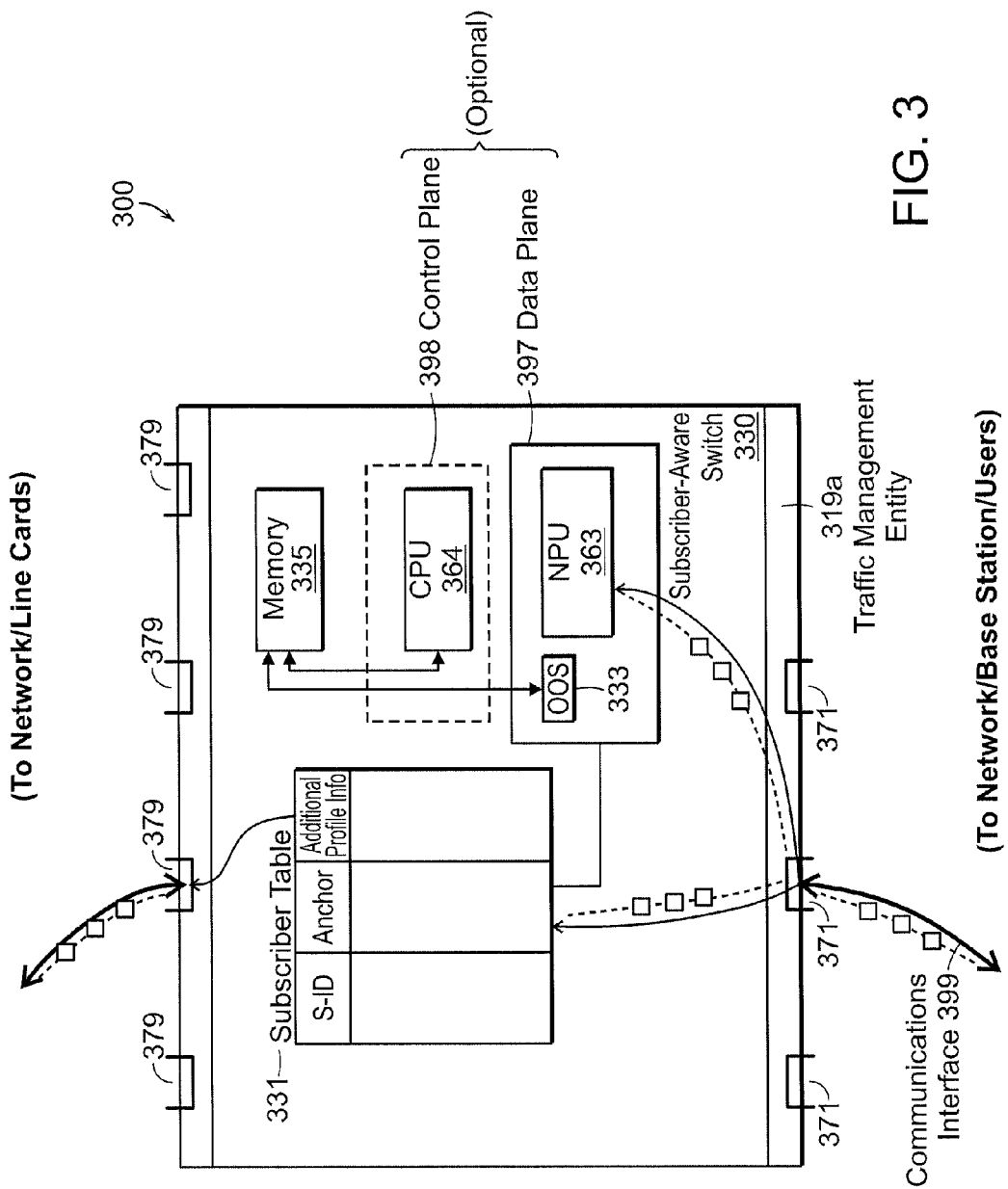
FIG. 3 is a block diagram of an embodiment of the present invention that illustrates a network switch.

FIG. 3 is a block diagram 300 of a subscriber-aware switch 330 illustrating aspects of an example embodiment of the present invention. The example block diagram 300 may include a subscriber-aware switch 330, including, for example, some or all of a subscriber profile table 331, network processing unit (NPU) 363, central processing unit (CPU) 364, or memory 335.

To begin processing, a traffic packet 302 can be sent by a base station 340 (not shown), via a communications interface 399 (e.g., an optical fiber, copper wire, or air interface) and received by a traffic management entity (TME) 319a at the subscriber-aware switch, via a multitude of ingress-interface ports 371; alternatively, the traffic packet 302 can enter the subscriber profile table 331 directly. The subscriber profile table 331 can maintain subscriber profile information on a per-subscriber basis. The subscriber profile table 331 further can maintain the subscriber profile in a dynamic manner, including updating and learning subscriber information, such as a unique subscriber identifier 374, anchor line card 360, or additional information commonly employed or hereafter developed.

In an alternative embodiment, the traffic packet 302 can enter the NPU 363 directly. The ingress-interface ports 371 being decided by a routing protocol of the traffic packet 302 from the base station 340 to determine which port 371 to use to forward the traffic. The traffic packet 302 can enter the NPU 363, which can operate at a data plane 397 and maintain fast path packet switching at traffic rates or multiples of thereof in the data plane 397. The NPU 363 may perform any number of functional operations, including, for example, determining routing information, data manipulation, control processing, packet allocation, determine quality of service (QoS) parameters, or other commonly known or hereafter developed functions.

In alternative example embodiments of the present invention, the subscriber-aware switch can contain a central processing unit (CPU) 364, located, for example, in a control plane 398. The CPU 364 can receive the traffic packets 302, if necessary, an operating in a slow path. In an alternative example embodiment, the NPU 363, the CPU 364, or both the NPU 363 and CPU 364 can be interconnected operably to a memory 335, such as a ternary content addressable memory (TCAM). Alternatively, another example embodiment can include a QoS database 333 for maintaining QoS classifiers for the subscribers in a communications network like the network 100 of FIG. 1.

In an example embodiment, following the anchor line card (not shown) being determined by the subscriber-aware switch based on, for example, information in the subscriber profile table 331, the subscriber-aware switch can forward the traffic via an egress-output ports 379, egress TME 319b, or other commonly employed or hereafter developed method of switching communications traffic.

Alternative example embodiments of the present invention can determine, at the subscriber-aware switch, subscriber information, such as a subscriber service profile, source address, unique subscriber identifier, or other commonly known or hereafter developed subscriber information. In an example embodiment, the unique subscriber identifier may include, for example, an international mobile subscriber identity (IMSI), a media access control (MAC) address, an Internet protocol (IP) address, or other commonly employed or hereafter developed subscriber identifier. In one example embodiment, the subscriber-aware switch can determine subscriber information by observing signaling communications in order to determine the anchor line card corresponding to the unique subscriber identifier and forwarding the subscriber traffic to that anchor line card. Alternatively, the subscriber-aware switch can use a control packet to ensure the subscriber traffic is forwarded to the corresponding anchor line card maintaining the subscriber profile. In one example embodiment, the subscriber profile can be found in the control packet or as part of the signaling. Alternatively, the control packet can be parsed for a network access identifier (NAI), which can indicate a subscriber identifier at the subscriber's request for access to the network. The NAI can bind the subscriber identifier with the IP address associated to that subscriber; or the control packet can bind the NAI to the subscriber's IP address. In one example embodiment, the subscriber traffic at the anchor line card containing the subscriber profile can be transmitted across a fabric that interconnects multiple line cards in an operable manner. The fabric allowing for the traffic packet and the subscriber profile to be maintained across one or more line cards such that the subscriber information, e.g., quality of service (QoS) parameters, is maintained and traffic is classified. Details of QoS allocation are described further in Applicants' pending U.S. patent application Ser. No. 12/900,324 filed concurrently Oct. 7, 2010, entitled "Method and Apparatus for Efficient Resource Allocation of Quality of Service Profiles in Mobile Networks" by Santosh Chandrachood and Henry Fung, which claims priority to Applicants' U.S. Provisional Patent Application No. 61/278,505, filed Oct. 7, 2009, entitled "A Method and Apparatus for Efficient Resource Allocation of Quality of Service Profiles in Mobile Networks" by Chandrachood et al., the entire teachings of both applications being incorporated herein by reference in their entirety.

Figure 4A:
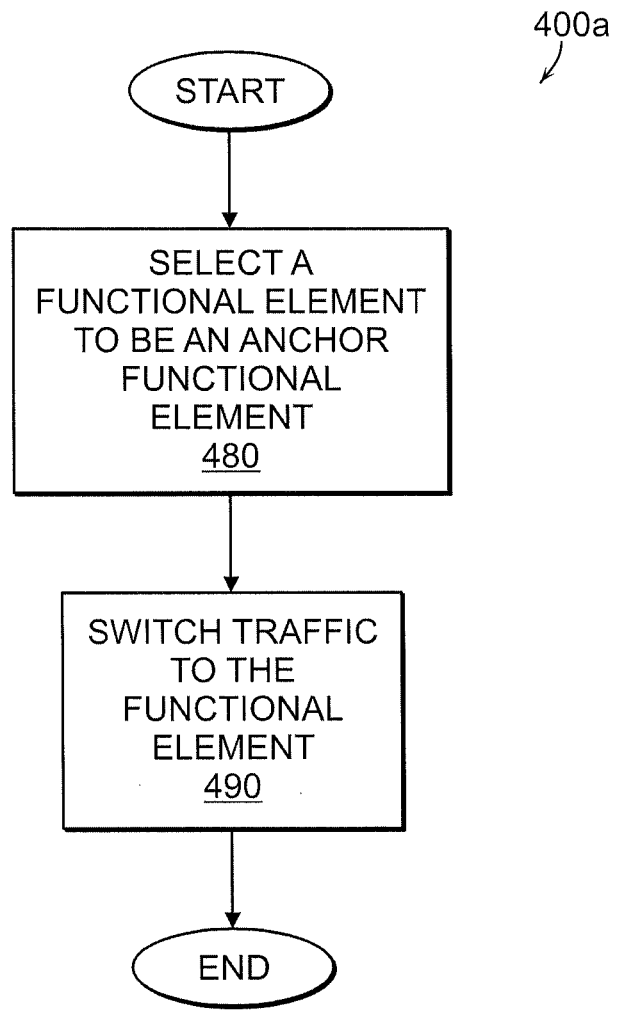
FIG. 4A is a flow chart of an embodiment of the present invention that illustrates functions involved in traffic switching.

FIG. 4A is a flow chart 400a illustrating a method by which a network node, such as the gateway node 120b of FIG. 1, can route subscriber traffic according to an example embodiment of the present invention. According to the example embodiment, the flow chart 400a selects a functional elements from among multiple functional elements in a chassis to be designated an anchor functional element (480), such as the line card 260a of FIG. 2. The network node may switch subscriber traffic to the designated anchor line card based on traffic identifiers associated with a subscriber identifier (490). Alternatively, the multiple functional elements may be located in different network elements being interconnected in any system configuration of any physical or logical configuration.

Figure 4B:
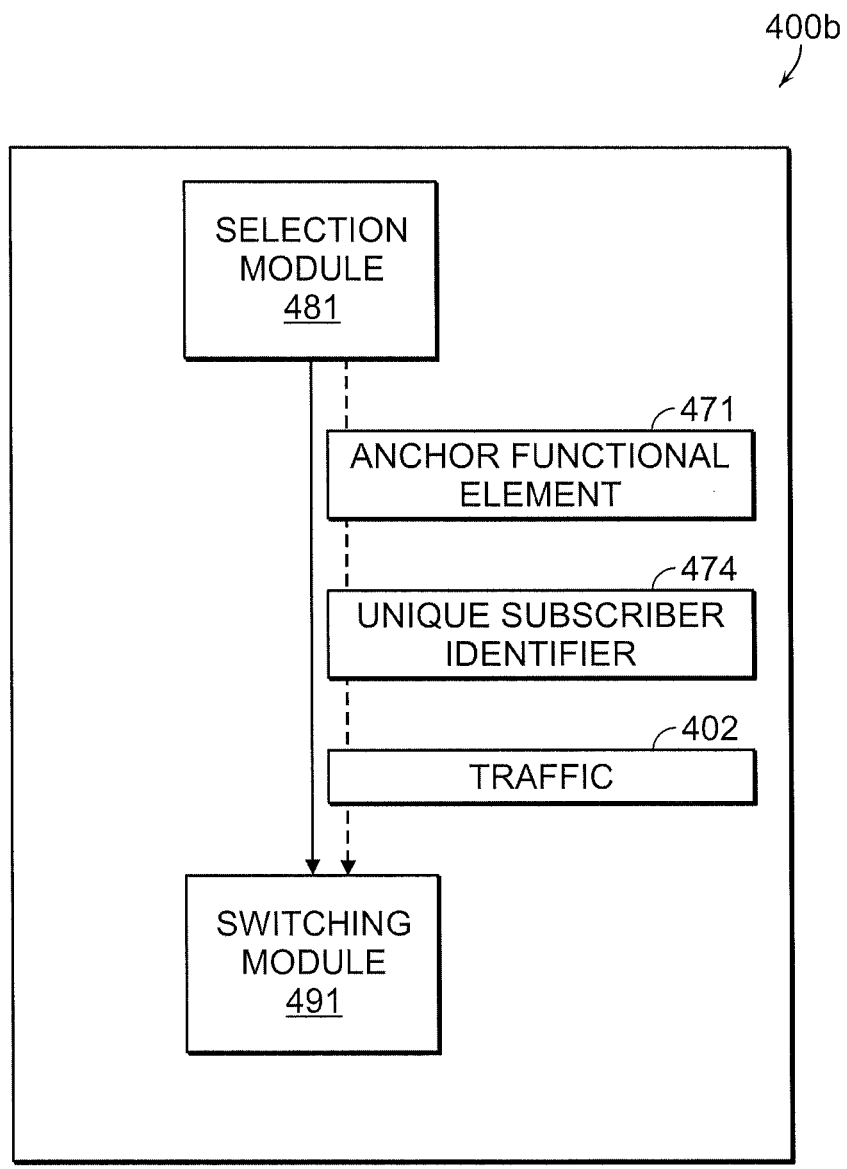
FIG. 4B is a block diagram of an embodiment of the present invention that illustrates components involved in traffic switching.

FIG. 4B is a block diagram 400b of a network node 426 illustrating aspects of an example embodiment of the present invention. Example embodiments of the network node 426 can include components, such as a selection module 481 and a switching module 491. The block diagram 400b can be a physical or logical representation and may exist, for example, in a line card at a gateway node in a network, such as an example network 100 of FIG. 1, or block diagram 400b can be distributed among multiple different physical network nodes. According to the example embodiment, the selection module 481 can employ a unique subscriber identifier 474 to designate a functional element from among multiple functional elements in a chassis to be an anchor functional element 471. The section module 481 can forward information, such as the anchor function element 471, the unique subscriber identifier 474, or the traffic 402 to the switching module 491. In alternative embodiments, any or all of the modules 481 and 491 may exist on a functional element at a network node or as individual, interconnected modules located at different sites on a network, like network 100 in FIG. 1.

Alternatively, example embodiments of the present invention can maintain a selection module to designate an anchor functional element from among other functional elements based on receipt of a signaling packet or traffic packet that contains or is associated with the unique subscriber identifier. In such an example embodiment, the anchor functional element may not have been established previously for that unique subscriber identifier. The selection module can forward a subscriber profile to a function element that is to be designated the anchor functional element based on receipt of that subscriber profile or the selection module may instruct the anchor functional element to retrieve the subscriber profile from another network element in the network.

Figure 5A:
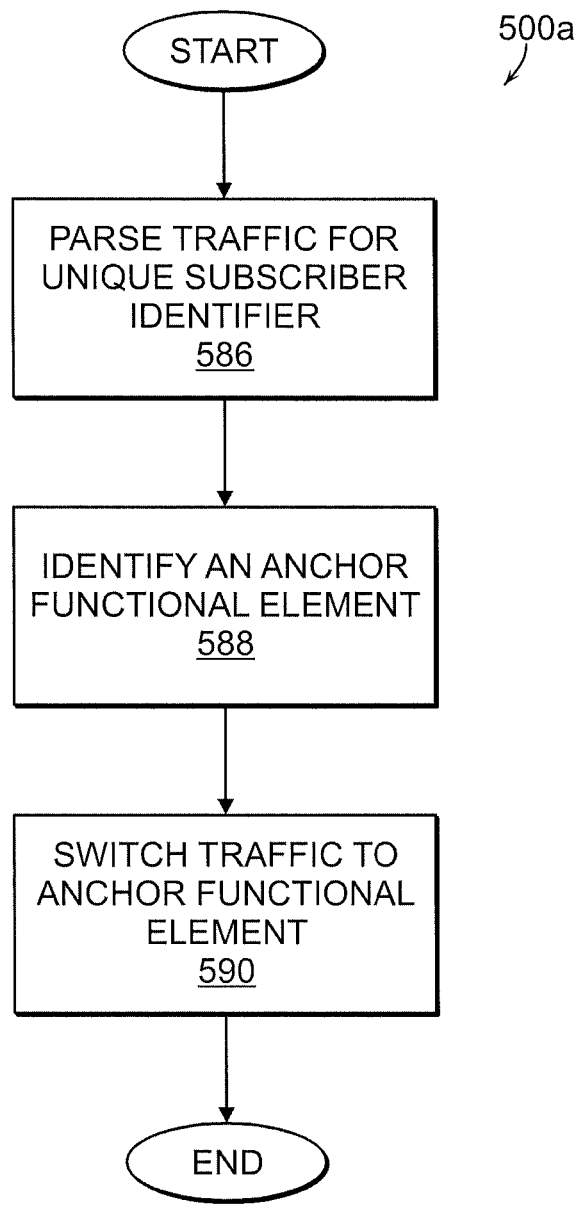
FIG. 5A is a flow chart of an embodiment of the present invention that illustrates switching traffic to a determined anchor functional element.

FIG. 5A is a flow chart 500a of an embodiment of the present invention illustrating switching traffic to a determined anchor functional element, such as the anchor line card 160a of FIG. 1. According to the example embodiment, the flow chart 500a parses communications traffic to determine a unique subscriber identifier (586). The flow chart 500a can identify an anchor functional element that maintains or has knowledge of a subscriber profile that corresponds to the unique subscriber identifier (588). Further, the flow chart 500a can switch the communications traffic to the identified anchor functional element (590). Alternatively, in example embodiment of the present invention, the multiple functional elements may be located in different network elements being interconnected in any system configuration of any physical or logical configuration.

Figure 5B:
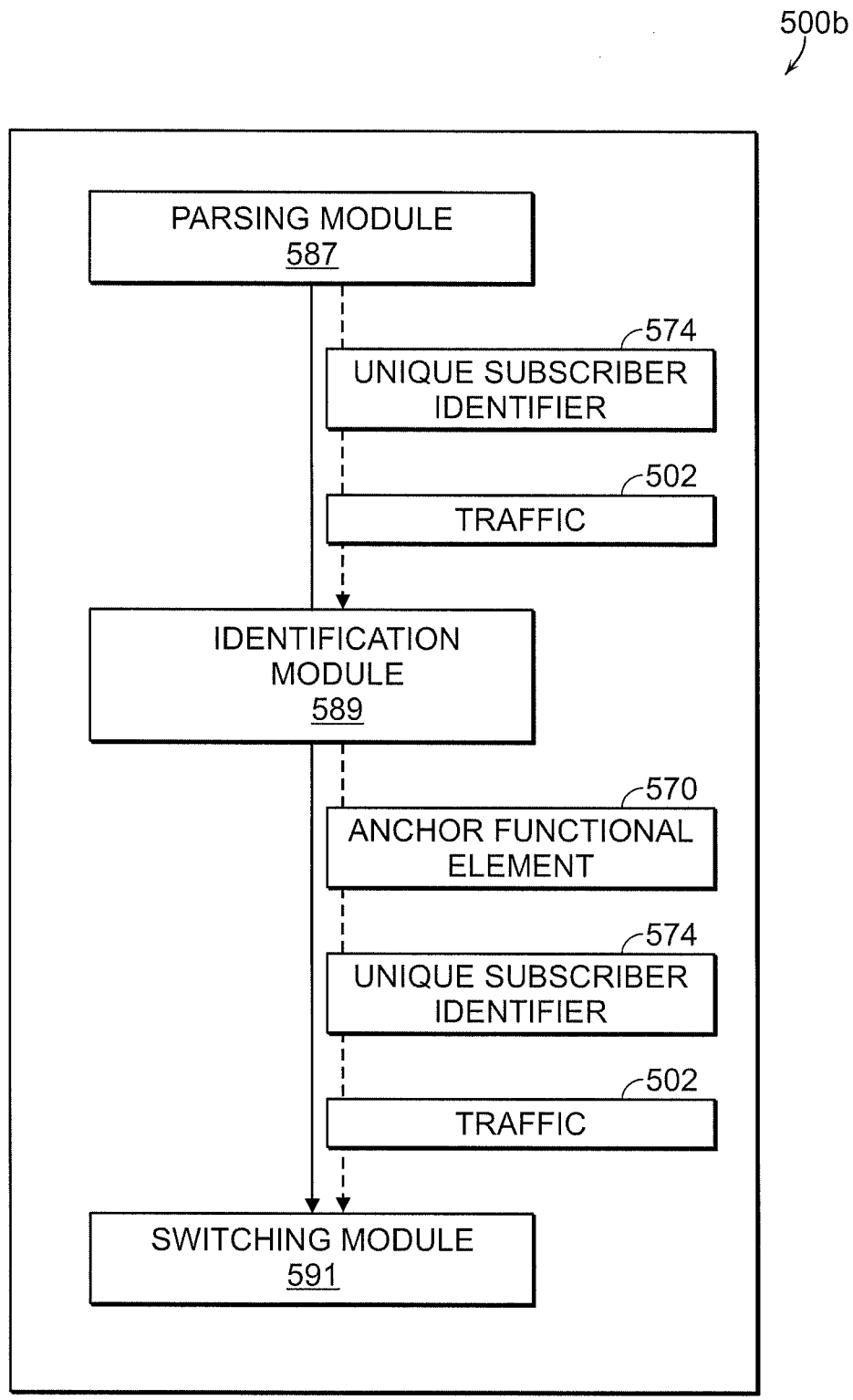
FIG. 5B is a block diagram of an embodiment of the invention that illustrates a component involved in switching traffic to a determined anchor functional element.

FIG. 5B is a block diagram 500b of a switch 530 according to an example embodiment of the present invention. Components of the switch 530 can include a parsing module 587, an identification module 589, and a switching module 591. According to the example embodiment, the parsing module 587 can parse communications traffic 502 to identify a unique subscriber identifier 574 for the specific communications traffic 502. The parsing module 587 can transmit one of the unique subscriber identifier 574, the traffic 502, or both, to the identification module 589. The identification module 589 can determine an anchor functional element 570 that includes a map or knowledge of a subscriber profile corresponding to the unique subscriber identifier 574. The identification module 589 can transmit information to the switching module 591, such as the determined anchor functional element 570, the unique subscriber identifier 574, and the traffic 502. The switching module 591 can forward the communications traffic 502 to the determined anchor functional element 570. In alternative embodiments, any or all of the modules 587, 589, 591 may exist on a functional element at a network node or as individual, interconnected modules located at different sites on a network, like network 100 in FIG. 1. Alternatively, example embodiments of the present invention can include modules being in a system of any physical or logical configuration.

Figure 6:
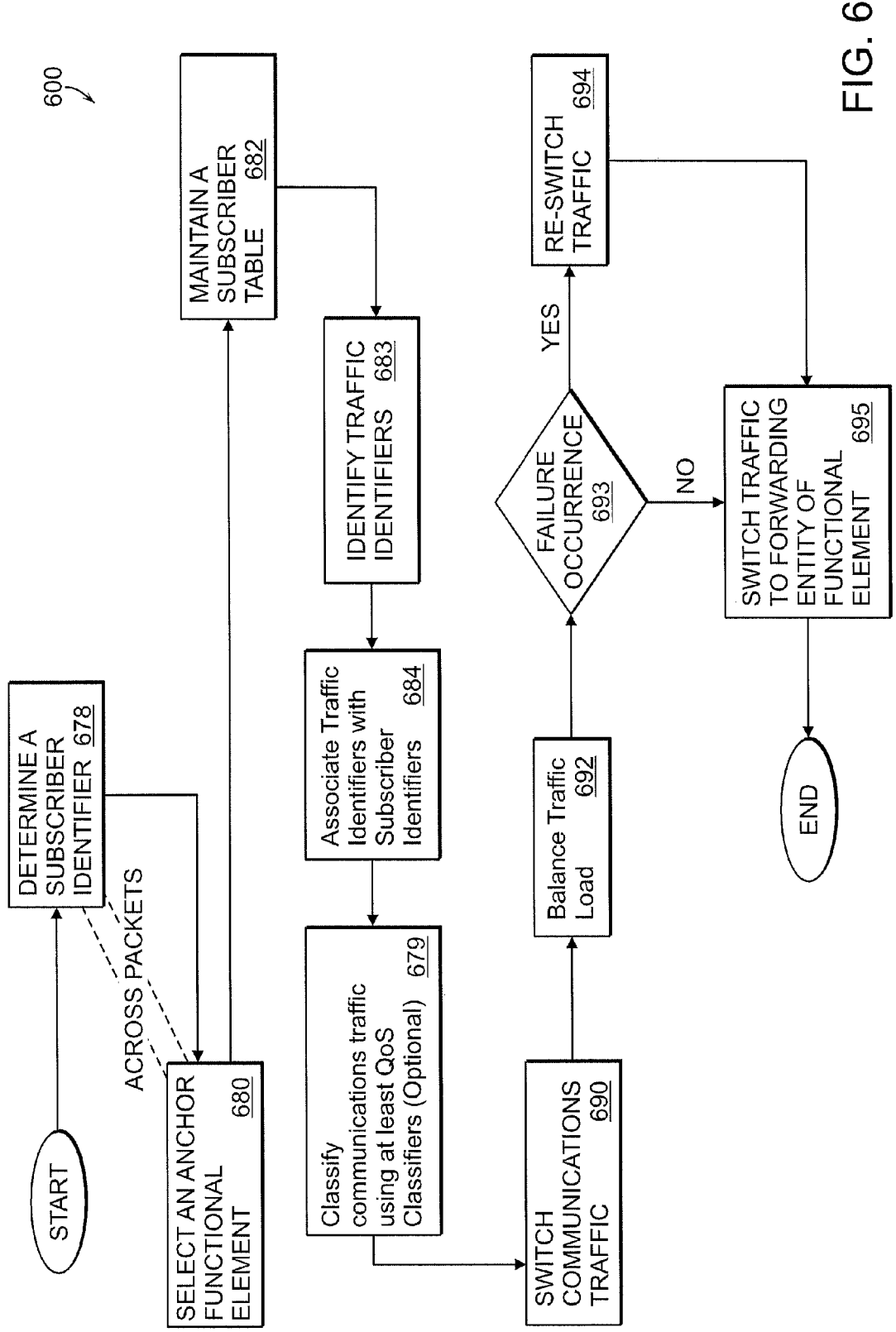
FIG. 6 is a flow diagram of an embodiment of the present invention that illustrates a method of switching traffic to a forwarding entity of a network functional element.

FIG. 6 is a flow diagram 600 of an example embodiment of the present invention illustrating a method of switching traffic to a forwarding entity of a network functional element. The example embodiment can be performed in one embodiment at a subscriber-aware switch having a configuration consistent with the subscriber-aware switch 230 of FIG. 2. Alternative example embodiments of the flow diagram 600 can be located at network elements or sub-elements interconnected operably in a communications network.

After beginning, the determination procedure of FIG. 6 determines a subscriber identifier based on, for example, an inspection of a traffic packet including the payload or alternative layers of the traffic packet (678). Based on the determined subscriber identifier, which can be a unique subscriber identifier, a subscriber-aware switch can determine an anchor line card, from among multiple line cards, which maintains the subscriber profile for the traffic packet (680). The subscriber-aware switch can classify the communications traffic based on, for example, quality of service (QoS) parameters associated with the subscriber identifier (679). The subscriber-aware switch can maintain a subscriber profile table (682), which can include subscriber information such as, the unique subscriber identifier, the corresponding anchor card, QoS parameters, service type, or additional information commonly employed or hereafter developed as subscriber information.

In the example embodiment of flow diagram 600, the subscriber-aware switch can identify traffic packet identifiers that can, for example, correspond to the unique subscriber identifier (683); the flow diagram 600 associating the traffic identifiers with the unique subscriber identifiers (684). The traffic identifiers can be the same as the subscriber identifier; alternatively, the traffic identifier and the subscriber identifier can be bound together to be part of the subscriber information or identification. The subscriber-aware switch can switch the traffic packet to a corresponding anchor line card based on, for example, the traffic identifiers associated with the unique subscriber identifiers (690). Alternatively, an example embodiment can switch the traffic packet according to the information maintained in the subscriber profile table, where the subscriber profile table can update entries in a dynamic manner. In another alternative example embodiment, communications traffic from a subscriber can be switched across ingress-interface ports of one or more line cards, interconnected by a fabric, based on QoS classifiers. The QoS classifiers can, for example, be transmitted with the traffic packet in the packet payload.

In example embodiments of the present invention, the subscriber-aware switch can balance traffic load using the subscriber profile table to forward the traffic to a forwarding entity of one of the line cards without overloading the interface (692). In alternative example embodiments, the subscriber-aware switch can perform load balancing based on traffic-rate factors, non-traffic rate factors, or other commonly employed or hereafter developed methods of load balancing. In other example embodiments of the present invention, the subscriber-aware switch can determine if a failure occurrence has occurred in the network (693), for example, a network node is overloaded. If a failure occurrence is detected, the subscriber-aware switch can redirect the traffic in a subscriber-aware, fast-forwarding routing manner (694); if a failure occurrence is not detected, the subscriber-aware switch can forward traffic to the anchor card with the subscriber profile (695).

Alternatively, example embodiments of the present invention can include a switch programmed with subscriber information, such that the subscriber-aware switch can transmit subscriber packets to a subscriber-aware network processing unit (NPU) via a fast-path (i.e., in a data plane, rather than in a control plane). In another alternative example embodiment, the subscriber-aware switch can be employed at or be accessible to a data plane, where the data plane switch allows for fast-path packet switching, for example, switching the traffic over a traffic rate bus that operates at traffic rates (e.g., 40 Gbps or 100 Gbps, or higher or lower) or multiples thereof in the data plane. In alternative example embodiments, the fabric can switch at traffic rates (e.g., 100 Gbps) or traffic rates multiplied by the number of slots available to switch through.

Further example embodiments can include quality of service (QoS) classifiers programmed into a switch to preserve the QoS classification, thereby enabling proper treatment for incoming subscriber traffic. The example embodiment can include load balancing subscriber traffic using subscriber tables to redirect traffic to a NPU hosting the subscriber's information in a manner avoiding overload of congested or otherwise problematic interface cards. In an alternative example embodiment, a subscriber profile associated with traffic can be dynamically added to the subscriber-aware switch, for example, added to the subscriber profile table or a memory such as a ternary content addressable memory (TCAM). The subscriber-aware switch can program the QoS classifiers in the subscriber-aware switch with the subscriber profiles, thereby making the subscriber-aware switch a midplane switch.

In yet another alternative example embodiment, the subscriber-aware switch can determine the unique subscriber identifiers based on deep packet inspection (DPI) of the traffic packets. In the example, DPI enables advanced packet examination by reaching deeper layers of the packet, in reference to, for example, an open systems interconnection (OSI) reference model, which has a seven layer stack. Alternatively, DPI can be performed in reference to a TCP/IP reference model, or other models commonly employed or hereafter developed. While DPI can be used to inspect even lower levels of a traffic packet, such as the physical (Layer 1), data link (Layer 2), or network layers (Layer 3), this type of inspection is normally considered shallow packet inspection. DPI can be used to view layers 4-7 of the IP data and provide a more detailed understanding of the type of traffic transported in a network. Based on the inspection, the subscriber-aware switch, anchor line card, or other line card(s) may apply traffic processing activities consistent with the corresponding subscriber's profile. Details of DPI are described further in Applicants' granted U.S. Pat. No. 8,531,945 filed concurrently Oct. 7, 2010, entitled "Method and Apparatus to Support Deep Packet Inspection in a Mobile Network" by Santosh Chandrachood, Pawan Uberoy and Rehan Jalil, which claims priority to Applicants' U.S. Provisional Patent Application No. 61/278,518, filed Oct. 7, 2009, entitled "Method and Apparatus to Support Network-Initiated VoIP voice over IP telephony using deep packet inspection" by Chandrachood and Applicants' U.S. Provisional Patent Application No. 61/278,519, filed Oct. 7, 2009, entitled "Method and Apparatus to Support Transfer of Context Generated Using Deep Packet Inspection Across Mobile Elements" by Chandrachood et al., the entire teachings of all applications being incorporated herein by reference in their entirety.

Alternatively, an example embodiment of the present invention may include a process for a subscriber profile table in a subscriber-aware switch to learn a location of a subscriber's profile among the line cards (or network nodes or logical modules, depending on implementation) or assign a location to the subscriber profile based on a dynamic function. The dynamic function can include, for example, a subscriber device with an unknown profile location, such that the subscriber profile table must send a request to a functional element to determine if the functional element contains the subscriber profile. The functional element may contain a network service processor (NSP) that can be queried for the subscriber profile. If the NSP cannot locate the subscriber profile, the functional element or a subcomponent thereof can send a request into the network to a subscriber database, such as a network service provider database. The network service provider can provide the service profile back to the functional element, which, in turn, can provide the subscriber profile to the subscriber profile table in the subscriber-aware switch. As such, the subscriber-aware switch can dynamically update, on a frequent or infrequent basis, the subscriber profiles. In an alternative embodiment, the subscriber profile table can be programmed, for example, by a network operator via provisioning or signaling nodes or via a direct terminal programming node, in order to update the subscriber profile table with new or changed subscriber information. In alternative example embodiments, the switch can employ the service profile of the subscriber to determine or interpret quality of service parameters.

Further example embodiments of the present invention may include a non-transitory computer readable medium containing instruction that may be executed by a processor, and, when executed, cause the processor to monitor the information, such as components or status, of at least a first and second network element. It should be understood that elements of the block and flow diagrams described herein may be implemented in software, hardware, firmware, or other similar implementation determined in the future. In addition, the elements of the block and flow diagrams described herein may be combined or divided in any manner in software, hardware, or firmware. If implemented in software, the software may be written in any language that can support the example embodiments disclosed herein. The software may be stored in any form of computer readable medium, such as random access memory (RAM), read only memory (ROM), compact disk read only memory (CD-ROM), and so forth. In operation, a general purpose or application specific processor loads and executes software in a manner well understood in the art. It should be understood further that the block and flow diagrams may include more or fewer elements, be arranged or oriented differently, or be represented differently. It should be understood that implementation may dictate the block, flow, and/or network diagrams and the number of block and flow diagrams illustrating the execution of embodiments of the invention.

While this invention has been particularly shown and described with references to example embodiments thereof, it will be understood by those skilled in the art that various changes in form and details may be made therein without departing from the scope of the invention encompassed by the appended claims.

What is claimed is:

1. A method of supporting network communications traffic, the method comprising:
    maintaining a subscriber table of anchor functional elements on a per-subscriber identifier basis;
    selecting, based on the subscriber table maintained, a functional element among multiple functional elements to be designated an anchor functional element for a unique subscriber identifier having a subscriber profile corresponding to the unique subscriber identifier, the multiple functional elements operably interconnected by a fabric and also operably interconnected by a subscriber-aware switch; and
    switching communications traffic having traffic identifiers therein, using the subscriber-aware switch, to one of the multiple functional elements based on the traffic identifiers and corresponding associations with the unique subscriber identifier to support network communications traffic.

2. The method of claim 1 wherein switching the communications traffic based on traffic identifiers further includes enabling traffic associated with the unique subscriber identifier to traverse to the anchor functional element associated with the unique subscriber identifier.

3. The method of claim 1 further comprising classifying, at the subscriber-aware switch, the communications traffic with at least one of multiple quality of service (QoS) classifiers and wherein switching the communications traffic further includes scheduling transmission of the corresponding communications traffic based on the at least one of multiple QoS classifiers.

4. The method of claim 1 further comprising classifying, at the subscriber-aware switch, the communications traffic with at least one of multiple QoS classifiers and wherein switching the communications traffic, in an event of a failover, further includes redirecting the communications traffic in a subscriber-aware, fast-forwarding, routing manner.

5. The method of claim 1 further comprising associating the unique subscriber identifier with the subscriber profile at one of the multiple functional elements, the functional elements containing the subscriber profile enabled to provide subscriber-related service parameters to the subscriber-aware switch.

6. The method of claim 1 wherein the functional element is a line card in a chassis or physical or logical element distributed about a network.

7. The method of claim 1 further including enabling the subscriber-aware switch to employ the subscriber table to map the subscriber identifier with the identity of the anchor functional element.

8. The method of claim 1 wherein selecting the functional element includes load balancing, at the subscriber-aware switch, the communications traffic based on the subscriber table, wherein load balancing includes selecting a functional element to be the anchor functional element based on a parameter representative of its available capacity with respect to other functional elements.

9. The method of claim 1 wherein:
    selecting the functional element is done responsive to receiving a signaling packet or traffic packet having a subscriber identifier without an anchor functional element previously established.

10. The method of claim 9 further including:
    selecting the functional element includes forwarding the subscriber profile to the functional element designated to be the anchor functional element or instructing the anchor functional element to retrieve the subscriber profile.

11. The method of claim 1 further comprising dynamically maintaining a subscriber profile table to learn a location of the subscriber profile, wherein selecting the functional element includes using the subscriber profile table dynamically maintained to determine that the functional element selected contains the subscriber profile.

12. A network node in a communications network, the network node comprising:
    a functional element, among multiple functional elements, designated an anchor functional element for a unique subscriber identifier having a subscriber profile corresponding to the unique subscriber identifier;
    a fabric operably interconnected to the multiple functional elements;
    a switch also operably interconnected to the multiple functional elements and configured to forward communications traffic to the anchor functional element based on a traffic identifier within the communications traffic and associated with the unique subscriber identifier to support network communications, wherein the anchor functional element is further configured to maintain, on a per-subscriber identifier basis, a subscriber table, the subscriber table accessible to the subscriber-aware switch.

13. The network node of claim 12 wherein the subscriber-aware switch is enabled to employ the subscriber table on a per-subscriber identifier basis.

14. The network node of claim 12 wherein the subscriber-aware switch is configured to parse communications traffic packets to determine whether the packets include the unique subscriber identifier and further configured to switch the packets to the anchor functional element associated with the unique subscriber identifier.

15. The network node of claim 12 wherein the subscriber-aware switch is still further configured to classify the communications traffic with at least one of multiple quality of service (QoS) classifiers and wherein the subscriber-aware switch is still further configured to schedule transmission of the communications traffic based on the at least one of multiple QoS classifiers.

16. The network node of claim 12 wherein the subscriber-aware switch is still further configured to classify the communications traffic with at least one of multiple quality of QoS classifiers and wherein the subscriber-aware switch is still further configured to redirect communications traffic in a subscriber-aware, fast-forwarding, routed manner in an event of a failover.

17. The network node of claim 16 wherein the multiple functional elements include forwarding entities, and wherein the switch includes a load balancing module configured to designate anchor functional elements in a load-balanced manner.

18. The network node of claim 12 wherein functional elements containing the subscriber profile are enabled to provide subscriber-related service parameters to the subscriber-aware switch with the unique subscriber identifier being associated with the subscriber profile at the anchor or functional element.

19. The network node of claim 12 further comprising a selection module configured to designate a functional element as an anchor functional element responsive to receipt of a signaling packet or traffic packet having a subscriber identifier without an anchor functional element previously established for the subscriber identifier.

20. The network node of claim 19 wherein the selection module is further configured to forward the subscriber profile to the functional element designated to be the anchor functional element or instruct the anchor functional element to retrieve the subscriber profile.

21. A computer program product including a non-transitory computer readable medium having computer readable instructions to support communications traffic in a communications network, wherein the computer readable instructions when executed by a processor, cause the processor to:
    maintain a subscriber table of anchor functional elements on a per-subscriber identifier basis;
    select a functional element, among multiple functional elements, based on the subscriber table maintained, to be designated an anchor functional element for a unique subscriber identifier having a subscriber profile corresponding to the unique subscriber identifier, the multiple functional elements operably interconnected by a fabric and also operably interconnected by a switch configured to switch the communications traffic, the switch thus being a subscriber-aware switch;
    switch the communications traffic, using the subscriber-aware switch, to the anchor or functional element based on a traffic identifier in the communications traffic and associated with the unique subscriber identifier to support network communication.

\* \* \* \* \*